United States Patent

Sleven et al.

[11] 3,894,347
[45] July 15, 1975

[54] THREE DIMENSIONAL CHAFF SIMULATION SYSTEM

[75] Inventors: Marvin O. Sleven; Daniel Hobel, both of Los Angeles, Calif.

[73] Assignee: Whittaker Corporation, Los Angeles, Calif.

[22] Filed: Oct. 24, 1965

[21] Appl. No.: 505,426

[52] U.S. Cl. .................................. 35/10.4; 343/18
[51] Int. Cl. ............................................ H04k 3/00
[58] Field of Search .............. 343/18 E; 35/10.4

[56] References Cited
UNITED STATES PATENTS

| | | |
|---|---|---|
| 3,291,885 | 12/1966 | Eisele ................................. 35/10.4 |
| 3,445,577 | 5/1969 | Sperling et al. .................... 35/10.4 |
| 3,604,828 | 9/1971 | Perkovich .......................... 35/10.4 |
| 3,760,418 | 9/1973 | Cash et al. ...................... 35/10.4 X |
| 3,838,201 | 9/1974 | Appling ............................. 35/10.4 |

*Primary Examiner*—T. H. Tubbesing
*Attorney, Agent, or Firm*—Donald E. Nist; Jay H. Quartz

[57] ABSTRACT

A simulated radar system in which changing conditions of simulated chaff may be viewed on the cathode ray screens of a plan position indicator and range height indicator to effectively observe such changing conditions in three dimensions for study and training purposes.

3 Claims, 12 Drawing Figures

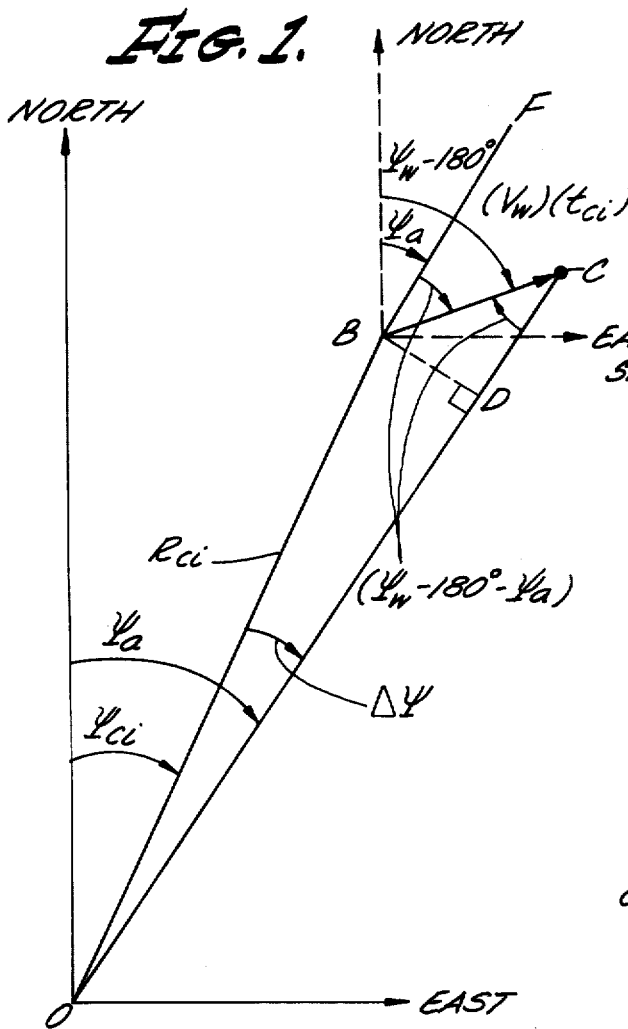
FIG. 1.
FIG. 2.
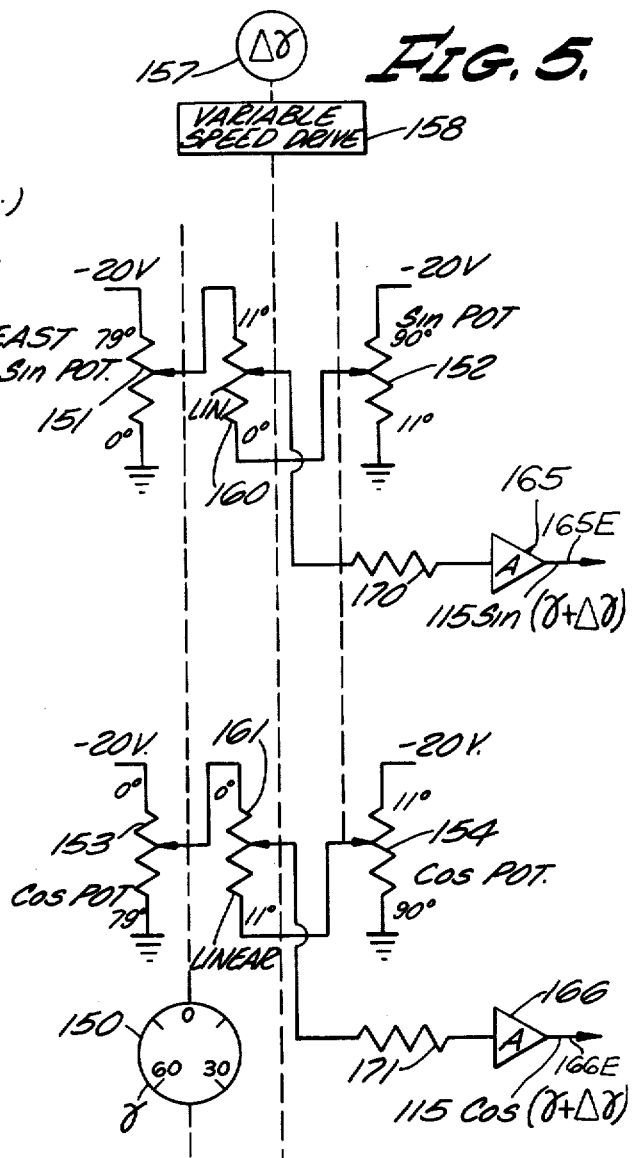
FIG. 5.

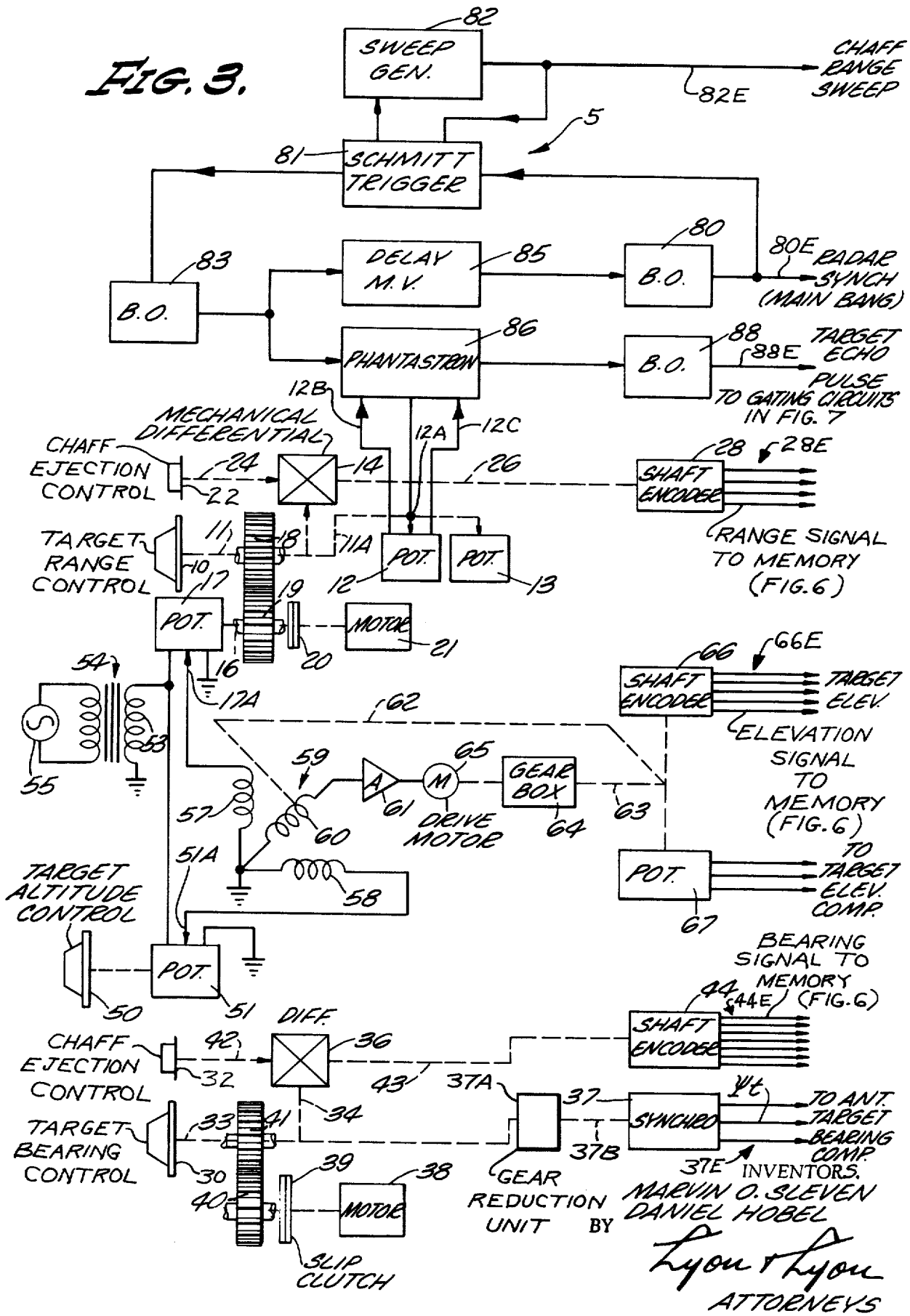

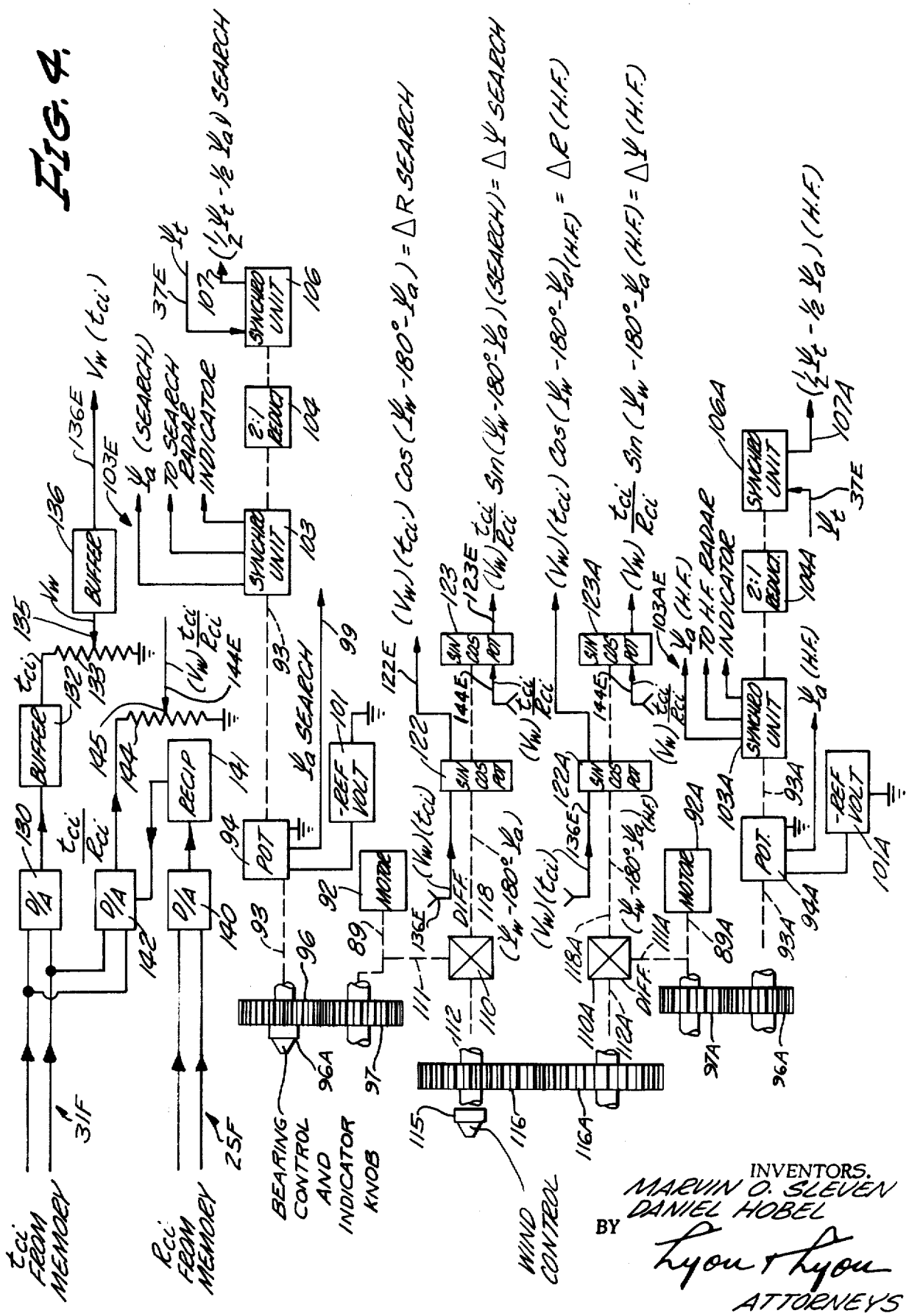

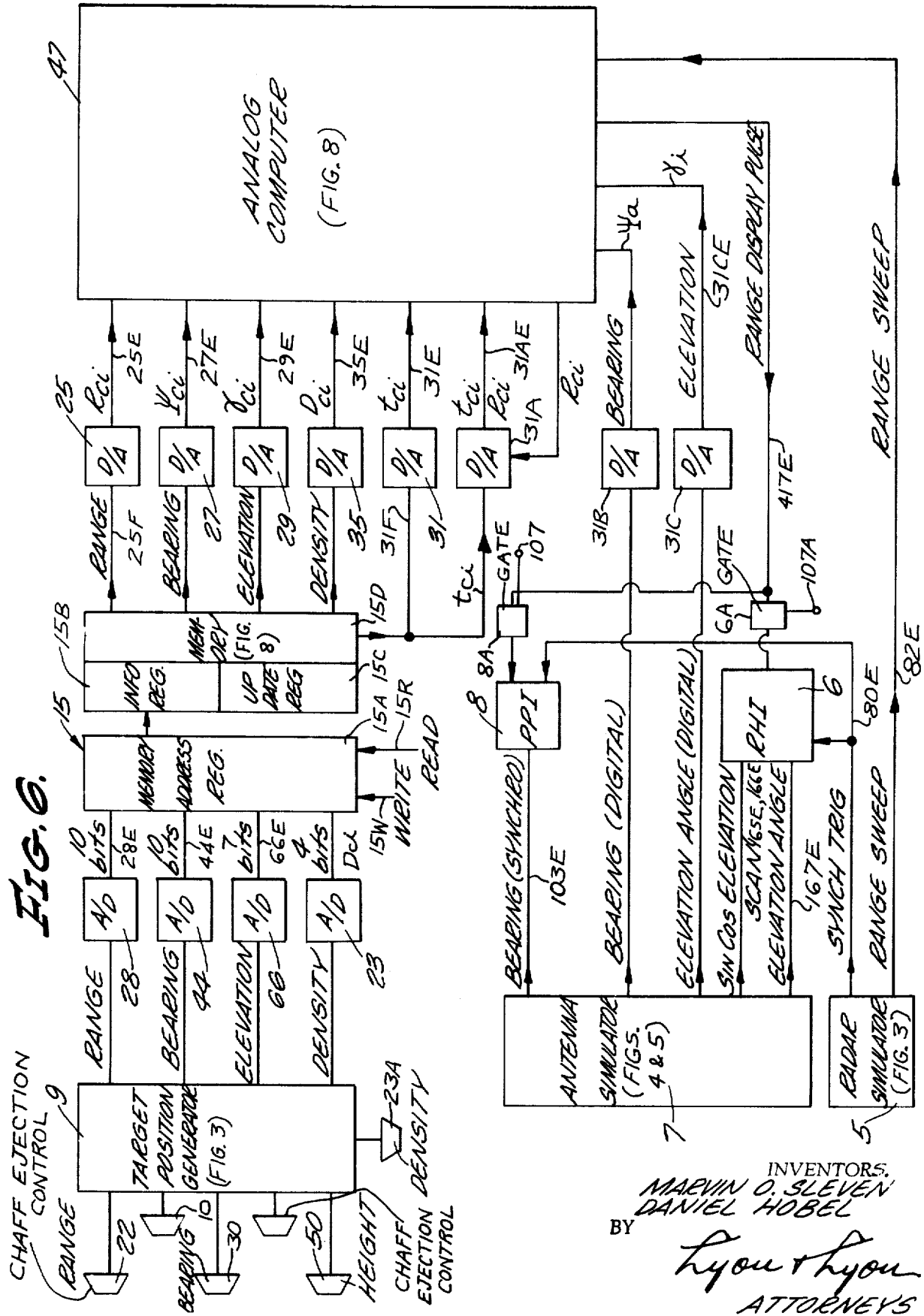

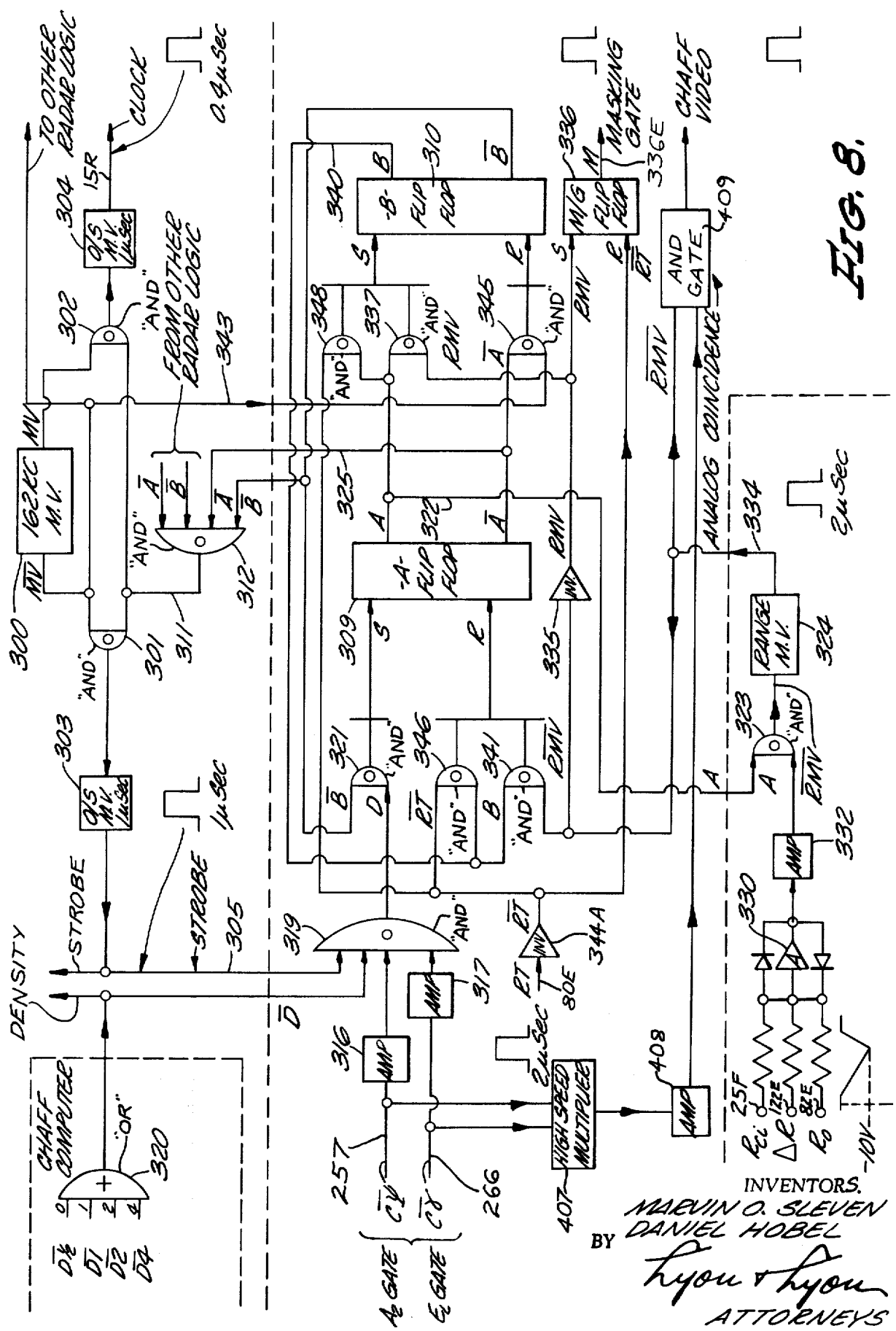

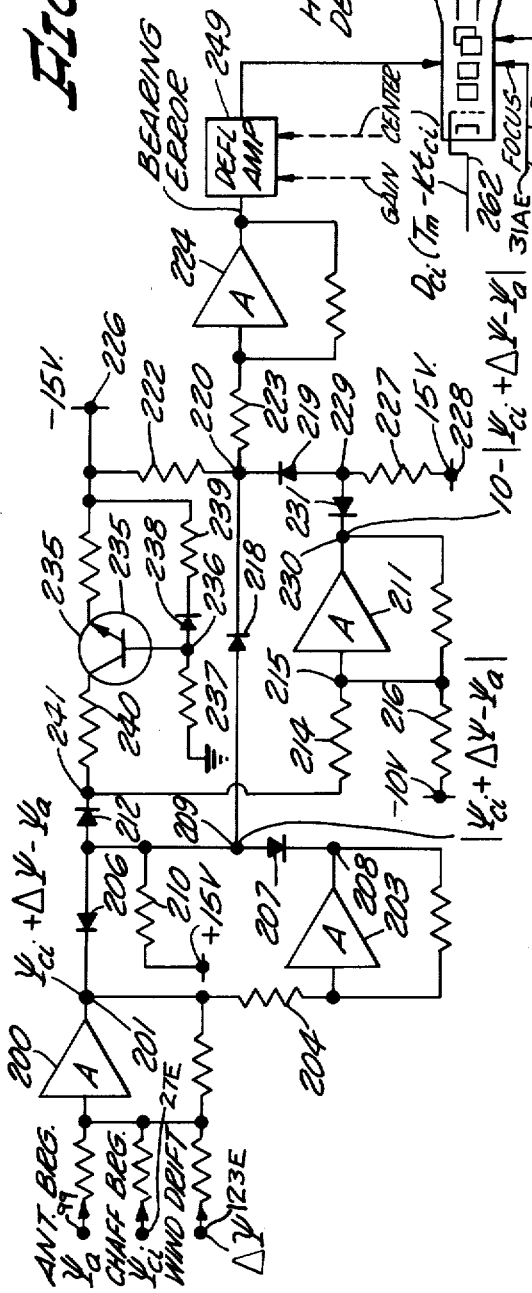
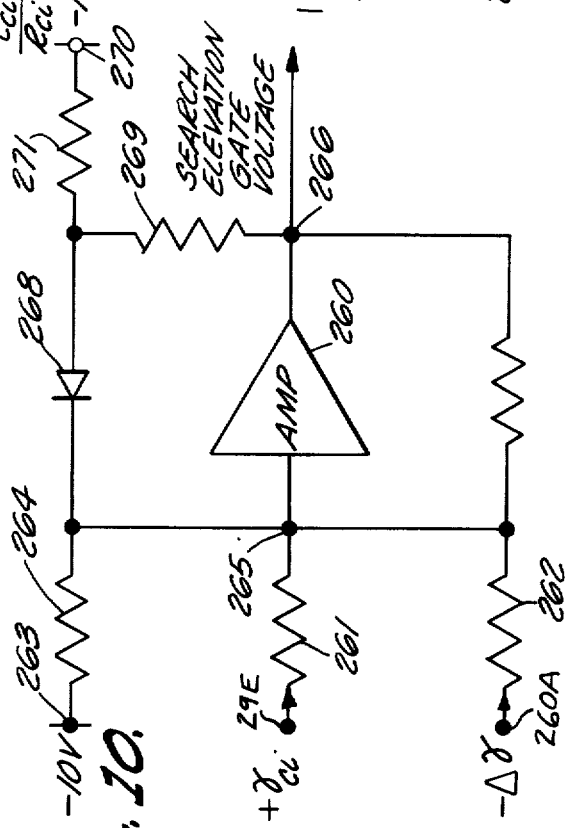
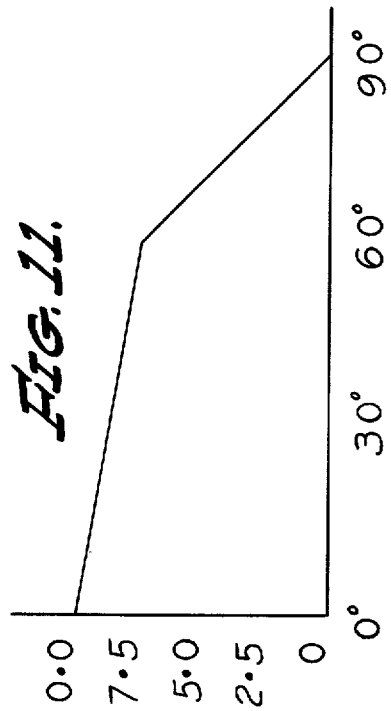

THREE DIMENSIONAL CHAFF SIMULATION SYSTEM

The present invention relates to means and techniques particularly useful in simulating chaff and its various properties which undergo change with time and displaying such chaff with its changes in terms of its range, bearing and elevation whereby one may observe the chaff and its changes in three dimensions using for this latter purpose two indicating systems, namely a plan position indicator system and a range height indicator system.

The term chaff is used herein in its generally accepted meaning and has reference to, for example, strips of metal either in the form of flat bands or hair-like pieces cut to various lengths and dispensed by aircraft for confusing indications on a radar screen otherwise discernible to a radar operator and for concealing the movement of aircraft.

The apparatus described herein is entirely ground based and serves to produce indications which are representative of actual chaff and thus the same is referred to as a three dimensional chaff simulator.

The three dimensional chaff simulator as disclosed employs electro-mechanical analog devices to generate range, bearing and elevation values for a simulated moving airborne target. Electro-mechanical devices are also used to generate bearing and elevation angles for a simulated Height-Finder radar antenna and bearing angle for a simulated Search radar antenna.

Separate synchronizing pulses and video signals in real time are generated for each of the two simulated radar sets. These outputs, along with appropriate antenna position signals are fed to a model VE radar PPI indicator and to a model VL-1 Range-height indicator. The indicators are used to display the synthetic target and chaff radar return signals.

No modifications of the two conventional indicator units are required since all synthetic signals are generated in real time and are compatible with the above units.

The simulator employs three shaft encoders to convert range, bearing and elevation of the target into binary-coded digital representation. These coordinate data are then entered into a magnetic core memory system upon command. Each set of three coordinates stored in memory represents the starting point in space of an individual chaff bundle. A four-bit value representing bundle size is also stored in memory for each coordinate point. The memory system generates an "age" term for each set of coordinate data that is set to zero when a new coordinate data point is stored. The age term gradually increases to maximum in 30 minutes. A complete set of data thus describes the position at which an individual bundle of chaff was ejected (in Range, Bearing and Elevation angle) and also defines the density and age of that bundle. Such a complete set of data is referred to as a "Word."

The core memory system is capable of storing three hundred twenty words, each word containing 40 bits. Ten bits are assigned to Range ($R_{ci}$) ten bits for Bearing ($\Psi_{ci}$), seven bits for elevation ($\gamma_{ci}$), eight bits for age ($t_{ci}$), four bits for bundle density ($D_{ci}$). One bit is a spare and is not used.

Data for the chaff bundles are read one word at a time from the core memory system and after digital-to-analog conversion, are applied to a high speed analog computer. The analog computer circuits make a rapid comparison of chaff bundle bearing and elevation angles with those of the simulated radar antennae. If a match is found, the core memory output is inhibited from stepping until the range value of the chaff bundle is equal to an internally generated real-time range sweep. At this instant a range display pulse is generated whose amplitude is determined by the analog computer as a function of density (i.e., the weight of the "foil packet"), degree of antenna chaff bundle elevation and bearing match, radar range to the chaff bundle and age of the chaff bundle. The duration of the display pulse is determined by the age, to simulate dispersion of the chaff with time. Also included in the effects simulated are the fading of chaff with time, the fall of chaff with gravity and the drift of chaff with wind.

It is therefore a general object of the present invention to provide a three dimensional chaff simulation of this character.

A specific object of the present invention is to provide a system of this character wherein the chaff is displayed on one or more conventional indicating systems and in particular simultaneously on a plan position and a range height indicating system whereby three dimensional features of the chaff may be observed.

Another specific object of the present invention is to provide a system of this character wherein the chaff information and its changes are derived from a memory system.

Another specific object of the present invention is to provide a chaff simulator system which incorporates a digital core memory and a high speed analog computer to provide real time simulation of the radar range-height and PPI (plan position indicator) presentations for a larger number of chaff bundles dropped from a simulated air target.

Another specific object of the present invention is to provide a system of this character in which the system equations implemented by physical apparatus provide a realistic approximation to existing conditions and with such equations allowing a relatively simple approach in simulator mechanization, and also allowing the chaff coordinate data to be stored in the magnetic core memory for subsequent use.

Other objects and advantages of the present invention will be apparent from the following description, reference being made to the accompanying drawings wherein:

FIGS. 1 and 2 are vector diagrams illustrating geometrical relationships upon which chaff computations are based and which are used in intrumentation of the system.

FIG. 3 illustrates details of an electromechanical target position generator.

FIG. 4 illustrates details of the radar antenna bearing simulation system.

FIG. 5 illustrates details of the range-height antenna elevation system.

FIG. 6 is a block diagram of the system.

FIG. 8 illustrates details of the memory control system and the logic thereof.

FIG. 9 illustrates details of the chaff bearing comparison circuit.

FIG. 10 illustrates details of the search elevation gate computer circuit.

FIG. 11 is a graph illustrating the relation between search elevation gate output voltage and chaff elevation angle.

GENERAL SYSTEM DESCRIPTION (FIG. 6)

Figure 7:
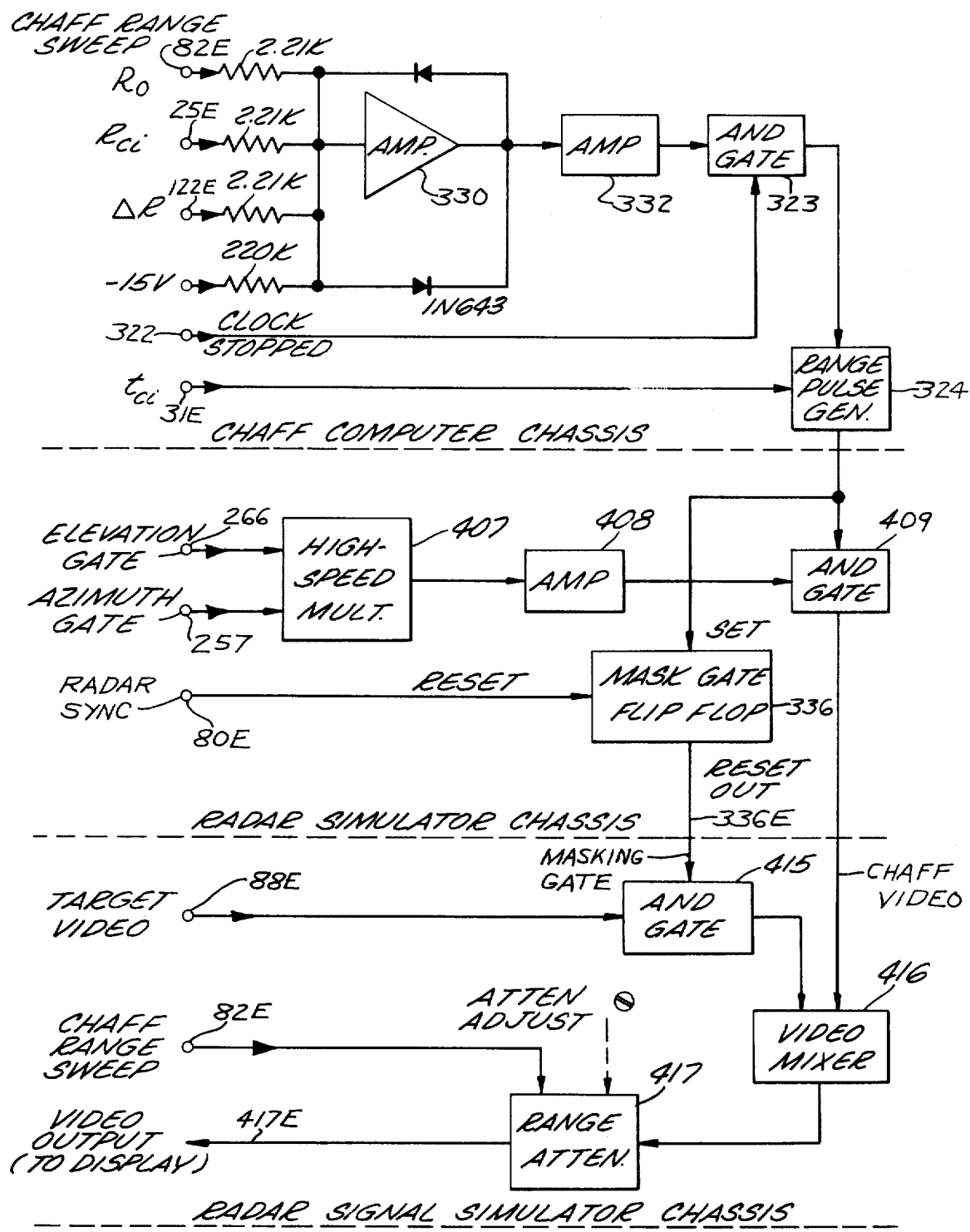
FIG. 7 illustrates details of the chaff generating and processing means.

The three-dimensional chaff simulator employs electro-mechanical analog devices within a target position generator 9 to generate range, bearing and elevation values for a moving airborne target. Electromechanical devices within an antenna simulator 7 are also used to generate bearing and elevation angles for a simulated height-finder radar antenna and bearing angle for a simulated Search radar antenna.

Separate synchronizing pulses and video signals in real time are generated in radar simulator 5 for each of the two simulated radar sets. These outputs, along with appropriate antenna position signals are fed to a model VE radar PPI indicator 8 and to a model VL–1 range-height indicator (RHI), 6. The indicators 6 and 8 are used to display the synthetic target and chaff radar return signals.

No modifications of the indicator units 6 and 8 are required since all synthetic signals are generated in real time and are compatible with the above units.

Three shaft encoders 28, 44, 66 (FIGS. 3 and 6) are used to convert range, bearing and elevation of the target into binary-coded digital representation. As shown in FIG. 6, these coordinate data are then entered into the magnetic core memory system or memory address register 15 upon command. Each set of three coordinates of range, bearing and elevation respectively, stored in memory represents the starting spatial position of an individual chaff bundle. A value representing bundle size or density in accordance with the setting of density control knob 23A is also developed and converted into digital form in analog to digital converter 23 and stored in memory system for each coordinate point. The memory generates an age term for each set of coordinate data that is set to zero when a new coordinate data point is stored. The age term gradually increases to maximum in 30 minutes. A complete set of data thus describes the position at which an individual bundle of chaff was dropped (in Range, Bearing and Elevation angle) and also defines the density and age of that bundle. Such a complete set of data is called a Word.

The core memory system 15 is capable of storing three hundred twenty words, each word containing 40 bits. Ten bits are assigned to Range ($R_{ci}$), 10 bits for Bearing ($\Psi_{ci}$), seven bits for elevation ($\gamma_{ci}$), eight bits for age ($t_{ci}$), four bits for bundle density ($D_{ci}$). One bit is a spare and is not used.

These expressions have the following meaning:
$R_{ci}$ is the initial range of the ith chaff bundle
$\Psi_{ci}$ is the initial bearing of the ith chaff bundle
$\gamma_{ci}$ is the initial elevation of the ith chaff bundle
$D_{ci}$ is the initial density of the ith chaff bundle
$t_{ci}$ is the age of the ith chaff bundle.

The memory system 15 may include a memory address register 15A to which "Write" and "Read" commands are applied, an information register 15B, and "Up Date Register" 15C and a "Memory" unit 15D.

Data for the chaff bundles are read one word at a time from the core memory system 15 and after digital-to-analog conversion in digital to analog converters 25, 27, 29, 31 and 35, are applied to high speed analog computer 47. A digital to analog converter 31A receives input quantities $t_{ci}$ and $R_{ci}$ and develops a voltage representative of their quotient, such voltage being applied to the computer 47 together with "bearing" and "elevation" voltages derived respectively from digital to analog converters 31B, 31C. The analog computer circuits make a rapid comparison of chaff bundle bearing and elevation angles with those of the simulated radar antennae. If a match is found, the core memory output is inhibited from stepping until the range value of the chaff bundle is equal to an internally generated real-time range sweep. At this instant a range display pulse (chaff video representative of echo signals from chaff and produced by means described in further detail below) is generated whose amplitude is determined by the analog computer as a function of density (i.e., the weight of the "foil packet"), degree of antenna chaff bundle elevation and bearing match, radar range to chaff bundle, and age of the chaff bundle. The duration of the display pulse is determined by the age, to simulate dispersion of the chaff with time.

Also included in the effects simulated are the fading of chaff with time, the fall of chaff with gravity and the drift of chaff with wind.

System Equations (FIGS. 1 and 2)

The equations that are implemented in the three-dimensional chaff simulator are developed with reference to FIGS. 1 and 2 and the same are used in developing chaff coordinate data which is stored in a magnetic core memory for further use.

FIG. 1 illustrates vectors in somewhat exaggerated form for purposes of clarity and is used to derive the geometrical relationships upon which chaff computations are based. The radar set is assumed to be located at the origin of the polar coordinate system, point O. At some time, a single bundle of chaff is dropped at point B, at a distance $R_{ci}$ from the origin and at a true bearing $\Psi_{ci}$. A wind of velocity $V_w$ and direction $\Psi_w$ has been blowing steadily since the bundle was dropped, so that in time $t_{ci}$, the bundle has drifted to point C. The antenna of the simulated radar is pointing in a direction $\Psi_a$ and is "looking" in the direction of the chaff bundle, now at point C.

A line BF is drawn through point B so that it is parallel to the line OC. Since the line BC intersects two parallel lines, the angles FBC and DCB are equal. Angle FBC is seen to be the difference between the antenna angle and the angle of the wind vector, namely, $$\text{Angle DCB} = \Psi_w - 180° - \Psi_a \quad (1)$$

The length of the line BC is determined by multiplying the values of wind velocity and the age of the chaff bundle, to obtain $$BC = (V_w)(t_{ci}) \quad (2)$$

Since the angle BOD is usually small, much smaller than an exaggerated in FIG. 1 for purposes of clarity, the length of the line OB is essentially equal to the line OD, or $$OD = R_{ci} \tag{3}$$

The range component of wind drift, $\Delta R$, is the line DC, and is determined from the trigonometric relationship within the right triangle CDB, namely, $\Delta R = DC = (V_w)(t_{ci}) \cos(\Psi_w - 180° - \Psi_a)$. This quantity is obtained at the output of the sin-cos potentiometer 122 as indicated in FIG. 4.

$$\tag{4}$$

The final range, $R_f$, to the drifted chaff bundle consists of the sum of lines or vectors OD and DC, so that adding equations (3) and (4), $$R_f = OD + DC = R_{ci} + (V_w)(t_{ci}) \cos(\Psi_w - 180° - \Psi_a). \tag{5}$$

The computation of the bearing component of wind drift, $\Delta\Psi$, makes use of the fact that the angle $\Delta\Psi$ is typically small. The line DB is approximately equal to the length of arc of a circle of radius $R_{ci}$ that is subtended by a central angle $\Delta\Psi$. This is conventionally expressed as $$s = r\theta \tag{6}$$

Which in the present instance results in the following equation $$BD = R_{ci}(\Delta\Psi). \tag{7}$$

The length of the line BD is obtained from the trigonometric relationship within the right triangle CDB, yielding $$BD = (V_w)(t_{ci}) \sin(\Delta_w - 180° - \Psi_a) \tag{8}$$

By substituting in equation (7) the result $$R_{ci}(\Delta\Psi) = (V_w)(t_{ci}) \sin(\Psi_w - 180° - \Psi_a) \tag{9}$$

is obtained. Rearranging terms gives the equation that is implemented in the three-dimensional chaff simulator.

$$\Delta\psi = \frac{t_{ci}}{R_{ci}} V_w \sin(\psi_w - 180° - \psi_a). \tag{10}$$

The bearing correction $\Delta\Psi$ is then added to the stored bearing of the chaff bundle, $\Psi_{ci}$, to obtain the final wind-drifted value for the bearing of the bundle.

$$\psi_f = \psi_{ci} + \Delta\psi = \psi_{ci} + \frac{t_{ci}}{R_{ci}} V_w \sin(\psi_w - 180° - \psi_a) \tag{11}$$

The equation for the fall of chaff due to gravity is similarly derived. FIG. 2 shows the geometry used in chaff elevation angle computation.

A single bundle of chaff is assumed to have been dropped at point A, at an initial range, $R_{ci}$, and elevation angle, $\gamma_{ci}$, these values being stored in a core memory as explained later. The chaff has been falling due to gravity at a rate of $V_f$ for a time $t_{ci}$ and is now located at point B. The antenna of the radar set is located at point O.

Since the range to the chaff bundle is generally very large with respect to the height, the elevation angle correction, $\Delta\gamma$, is small. This allows the assumption that the range does not change appreciably as a chaff falls. Through the use of this assumption, the length of the line OB (in FIG. 2) is approximately equal to that of the line OA, or $$OB = OA = R_{ci} \tag{12}$$

The length of line AB is the product of the fall rate ($V_f$) and the time of fall ($t_{ci}$).

$$AB = (V_f)(t_{ci}) \tag{13}$$

Since $\Delta\gamma$ is small, the line AB is essentially equal to the length of the arc of a circle of radius $R_{ci}$ that is subtended by the central angle $\Delta\gamma$, so that $$AB = (R_{ci})(\Delta\gamma). \tag{14}$$

Substituting equation (14) into (13) results in $$(R_{ci})(\Delta\gamma) = (V_f)(t_{ci}) \tag{15}$$

Rearranging terms provides $$\Delta\gamma = \frac{t_{ci}}{R_{ci}} V_f \tag{16}$$

The final elevation angle of the chaff bundle is obtained by subtracting the correction $\Delta\gamma$ from the initial elevation angle, $\gamma_{ci}$.

$$\gamma_f = \gamma_{ci} - \frac{t_{ci}}{R_{ci}} V_f \tag{17}$$

This equation is implemented in the chaff simulator.

For the simulation of the fading of chaff with time, an attenuation factor is generated. Since the available data indicates that the fading is highly variable, depending on wind and other uncontrollable factors, an arbitrary factor is chosen. The equation used is $$\alpha = D(T_m - k_1 t_{ci}) \tag{18}$$

where $\alpha$ is the attenuation factor, D is the original size of the bundle, $T_m$ is the maximum problem time (30 minutes), $t_{ci}$ is the age of the bundle (stored in core memory) and $k_1$ is a constant which may be set to 1, ¼ or ½ by an internal toggle switch in the simulator to simulate various fading conditions.

In order to simulate the dispersion of chaff with time, two techniques are used. Since the dispersion is three-dimensional, the apparent azimuth and elevation beam widths of the radar antennae are increased as the chaff disperses. This increase in beam width is controlled so that it is proportional to chaff bundle age but is inversely proportional to the range of the bundle. Thus, a beam width determining factor is generated of the form $$\beta = k_2 \frac{t_{ci}}{R_{ci}} \quad (19)$$

where $\beta$ is the beam width factor, $k_2$ is an adjustable constant, $t_{ci}$ is the age of the chaff bundle and $R_{ci}$ is the range of the chaff bundle. This factor, $\beta$, is computed separately for each chaff bundle, and is used to increase the azimuth beam width of the simulated search radar antenna and both the azimuth and elevation beam widths of the simulated Height-Finding radar antenna.

The synthetic chaff return video pulse is widened with age of the chaff bundle to take care of the third dimension of dispersion. The width of the pulse is expressed by the equation $$P_w = 2 + K_3 t_{ci} \text{ microseconds,} \quad (20)$$

where $P_w$ is the width of the pulse, (whose initial width is 2 microseconds, $t_{ci}$ is the age of the chaff bundle and $k_3$ is a constant chosen to make the bundle appear to expand to about ½ mile in diameter at $t_{ci} = 30$ minutes.

The simulation of attenuation of radar returns with increasing range is accomplished by generating an attenuation factor that causes the strongest target and the largest bundles of chaff to just disappear at the range of 200 miles. This factor is $$\rho = k_4 R \quad (21)$$

where $\rho$ is the attenuation factor $k_4$ is a constant and R is the range of the target or chaff bundle. This factor is subtracted from the amplitude of the video pulse as finally determined by all other factors, so that while strong targets fade at 200 miles, weaker targets fade earlier.

Target Position Generator and Target Range Pulse Generator (FIG. 3)

Target motion and position generators have heretofore been used in radar simulators and the same may be adapted to the present system in a manner now described in connection with FIG. 3 which illustrates also techniques for chaff simulation.

In FIG. 3 (also FIG. 6) the target range control knob 10 is illustrated as having its shaft 11 connected to the tap of each of a pair of ganged potentiometers 12 and 13 for purposes described later and to an input shaft of a mechanical differential or adder 14; and also such shaft 11 drives the shaft 16 of a potentiometer 17 to adjust the tap 17A thereon through a pair of gears 18, 19, the shaft 16 also being coupled to a reversible drive motor 21 through a slip clutch 20.

To simulate ejection of chaff bundle, as for example by means of rocket firing, a chaff range effect control in the form of a knob 22 is 7rovided 8aving 9ts shaft connected to an input shaft 24 2f the differential 14 so that the position of its output shaft 26 represents the sum of the angular positions of shafts 11 and 24, the output shaft 26 being coupled to a ten-bit shaft encoder unit 28 which is used to develop data in digital form representative of the position of shaft 26. Such data appearing on output leads 28E (FIGS. 3 and 6) is applied to the memory address register 15A.

Bearing data is digital form is obtained in like manner using bearing control knob 30; and to simulate ejection of chaff with respect to the target, bearing knob 32 is used. The bearing angle offset is inversely proportional to the range to the target at launch of the chaff bundle. The knob 30 has its shaft 33 mechanically coupled to an input shaft 34 of differential 36 and through a 2 to 1 gear reduction unit 37A to a shaft 37B of the synchro unit 37, the shaft 33 also being drivable by a reversible drive motor 38 through a slip clutch 39 and gears 40, 41. The output of unit 37 is connected via a series of leads 37E to the synchro units 107 and 106A in FIG. 4. The knob 32 is coupled to a second input shaft 42 of differential 36 having its output shaft 43 connected to the shaft encoder 44 used to provide digital data. Such data is applied via a series of leads 44E (FIGS. 3 and 6) to the memory address register 15A.

To provide for minimum memory requirements and to simplify the computation of antenna pattern and radar masking, the chaff simulator operates in polar coordinate form using range, bearing angle and elevation angle. Since the input data is specified in cylindrical coordinates conversion is required and such conversion involves the use of an arrangement which provides a servoed shaft positioned in accordance with target elevation.

For this latter purpose target elevation, altitude or height is set by the control knob 50 (FIGS. 3 and 6) having its shaft coupled to potentiometer 51 for adjustment of the tap 51A thereon.

As illustrated, one end terminal of each of the potentiometers 17, 51 is connected to the ungrounded terminal of the secondary winding 53 of a transformer 54 having its primary winding connected to an AC source 55, the other end terminal of each of potentiometers 17, 51 and the other terminal of winding 53 being grounded. Connected between the taps 17A, 51A is a pair of windings 57, 58 having their junction point gounded. These windings 57, 58 are stationary windings of a resolver 59 having a magnetically cooperating movable winding 60 mechanically coupled as indicated by the dotted line 62 to the output shaft 63 of a gear box 64 to form part of a servo system. This winding 60 has one of its terminals grounded and the other one of its terminals connected to a servo amplifier 61 which amplifies unbalanced or resultant voltage induced in winding 60 to drive the servo motor 65 and shaft 63 through gear box 64. The shaft 63 is automatically rotated to a stationary position wherein the net voltage induced in winding 60 is reduced to substantially zero value. The shaft 63 is mechanically coupled to the shaft of the seven bit shaft encoder unit 66 and also to the shaft of potentiometer 67 which provides an adjusted voltage to a target elevation comparator. The output of encoder 66 is applied via a series of leads 66E to the memory address register 15A.

It will be seen that ejection characteristics are provided by an additional offset in range and bearing using controllers 22 and 32 respectively in FIG. 3 to simulate the ejection of a chaff bundle by means of rocket firing. At the instant of chaff ejection, or drop, the range analog plus the range offset, as aplicable, is converted from analog to digital form in encoder 28 which may be performed as described or by using a ramp pickoff device which performs the conversion within approximately 1000 microseconds. Since the simulated aircraft moves imperceptibly during this time (at a speed controlled by drive motors 21 and 38) this conversion time is satisfactory. At the end of the conversion time, the digital number representing range is inserted in the next memory block of the digital storage device 15D in FIG. 6.

Likewise the bearing angle is provided with a mechanical offset upon ejection signal. This offset is inversely proportional to range and can be either called for as to the left or to the right of the range line. This offset angle is converted to a digital number representative of the bearing angle on the basis of a ten bit binary code. For purposes of simplification and without affecting the realism of the simulation, the elevation angle is not modified by the chaff ejection system and the elevation angle is converted directly into a digital number.

FIG. 3 also incorporates details of the target range pulse generator incorporated in each of the two radar simulator units. While FIG. 3 shows only one such pulse generator for purposes of simplicity it will be appreciated that two such units are provided, namely one for each of the two indicating systems.

The blocking oscillator 80 which develops the simulated radar synch pulse is connected so that it is free running at approximately 100 cycles per second. This synchro pulse may be applied via lead 80E to the PPI and RHI indicators 8 and 6 respectively in FIG. 6. When it fires, the range sweep is started on the radar indicator and the Schmitt trigger unit 81 is set. The Schmitt trigger unit 81 in turn starts the sweep generator 82 which may, for example, be a Miller integrator. The output of sweep generator 82 is applied via lead 82E as $R_o$ to an input terminal of amplifier 330, FIG. 8. When the sweep generator 82 output reaches a preset maximum the trigger unit 81 is reset and returns the sweep generator 82 to its initial state. At this time the trigger unit 81 initiates operation of a blocking oscillator 83 which in turn triggers both a delay multivibrator 85 and a phantastron unit 86 which has an output the duration of which is controlled by potentiometer 12 having its tap 12A positioned by the target range mechanism as indicated by the dotted line 11A, the outside terminals of such potentiometer 12 being connected through leads 12B, 12C to the phantastron unit 86. The phantastron's minimum operating time (at zero target range) is substantially equal to the delay imposed by the multivibrator 85 which has an output that trigers the blocking oscillator 80. An output of phantastron unit 86 initiates operation of a blocking oscillator 88 to develop a target echo pulse which as indicated by leads 88E in FIGS. 3 and 7 is applied to gating circuits associated with one of the two indicating systems. The potentiometer 13 is connected in like manner in a duplicate target range pulse generator system, for developing the sweep, synch signal and target echo pulse from which are used in the other indicating system. The two indicating systems referred to are the Height-Finder and Search types.

Antenna Simulator (FIG. 4)

The method of implementation of the radar antenna simulation (both for the Search and Range-Height indicating systems) results in simplification of solution of equations (5) and (11) above. The mechanization used is illustrated in FIG. 4.

A reversible drive motor 92 is used to provide rotation of the components, simulating the rotation rate of a real antennaa. A 360° potentiometer 94 has its shaft coupled to shaft 93. The shaft 93 mounts knob 96A and is coupled to motor shaft 89 through gears 96, 97, and is used to generate a DC analog voltage which is proportional to antenna bearing. This is the voltage $\Psi_a$ developed at the movable contact of the potentiometer and appearing on lead 99. The potentiometer 94 is constructed so that it has a very small gap that is shorted as the movable motor driven wiper traverses the gap. One outside stationary terminal of potentiometer is grounded and the other outside stationary terminal is connected to the ungrounded terminal of a reference voltage source 101. This shaft 93 serves also to drive a synchro unit 103 and also a two to one reduction unit 104 having its output shaft driving synchro unit 106. The synchro unit 103 is connected to the synchro unit in the search indicator to drive the same in synchronism with shaft 93 in accordance with $\Psi_a$, the antenna bearing. For this purpose the output of the synchro unit 103 in FIG. 4 is connected via a series of leads 103E to the PPI indicator 8 in FIG. 6. The other synchro unit 106, a control transformer, is connected to receive the input $\Psi_t$, target bearing, of synchro unit 37 (FIG. 3) and to develop the output ½ $\Psi_t$-½$\Psi_a$ on lead 107. As the simulated antenna turns, a null in the output of the control transformer 106 occurs every 180° of mechanical rotation of the control transformer shaft. Since 180° rotation of the control transformer corresponds to 360° of antenna rotation (because of the gear reduction unit 104), the null occurs once per antenna rotation. This null is converted into a gating signal for azimuth gating of the target range pulse as indicated in FIG. 6 wherein the range pulse is gated using a gating means 8A to which lead 107 is connected.

The azimuth portion of the height-finder antenna simulation is intrumented in like manner and for that reason like elements are identified by the same reference numeral except for the letter A. Thus, for example, the drive motor 92A corresponds to motor 92, the potentiometer 94A corresponds to potentiometer 94, etc.

The output of synchro unit 103A representing azimuth antenna position, $\Psi_a$ is connected via a series of leads 103AE to the synchro unit of the height finger indicator 6 in FIG. 6. The synchro unit or control transformer 106A has the input, $\Psi_t$, i.e., the output of unit 37 in FIG. 3 and develops an output, ½ $\Psi_t$ - ½ $\Psi_a$, at its output 107A and is used for the same general purposes as the output of unit 106 as indicated in FIG. 6 wherein the range pulse is gated using a gating means 6A to which the lead 107A is connected.

In each of these two antenna azimuth gear trains for the search and height finder indication systems is a corresponding mechanical differential 110, 110A having one of its input shafts 111, 111A coupled correspondingly to motor shafts 89, 89A. The other input shafts 112, 112A of differentials 110, 110A being coupled to a wind control knob 115, there being for this latter purpose a gear 116 on shaft 112 meshing with a gear 116A on shaft 112A. The wind direction control 115 drives both differentials 110, 110A so that each output shaft 118, 118A represents the difference between wind direction and antenna bearing for each simulated antenna. Two sine-cosine (SIN-COS) potentiometers 122, 123 and 122A, 123A are coupled to the corresponding output shaft 118, 118A of each differential 110, 110A and are used in the computation of the wind drift terms in equations (4) and (10) above.

An input to each of the potentiometers 122, 122A is the term ($V_w$) $t_{ci}$) and it appears on lead 136E in FIG. 4 and it is derived as also illustrated, at the top of FIG. 4, from an output leads 31F of a binary counter within the Up Date Register 15C (FIG. 6) of the the memory system which output is first converted into analog form by the digital-to-analog converter 130 having its output connected to buffer stage 132. This age term signal $t_{ci}$ is reset to zero by a "write" signal applied to lead 15W (FIG. 6) at a time when a chaff bundle is "dropped" and is updated each 7½ seconds thereafter and thus grows in steps to a maximum value after 30 minutes as described later. The output of stage 132 is the quantity $t_{ci}$ and the same is modified using a potentiometer 133 whose tap 135 is adjusted in accordance with the quantity $V_w$. This tap 135 is connected to a buffer stage 136 whose output is the desired quantity $V_w$ ($t_{ci}$) which is applied via lead 136E to each of the Sin-Cos potentiometers 122, 122A as mentioned previously.

The quantity $V_w$ ($t_{ci}/R_{ci}$) applied as an input to each of the Sin-Cos potentiometers 123, 123A via lead 144E is also derived from outputs of the memory system as also illustrated in FIG. 4 wherein a digital-to-analog converter 140 connected to output leads 25F is used to obtain the quantity $R_{ci}$, the reciprocal of such quantity, $1/R_{ci}$, being obtained at the output of the inverting or reciprocating unit 141 and the same is applied as one of the inputs to the digital-to-analog converter 142 together with digital information $t_{ci}$ from the memory system to derive the output $t_{ci}/R_{ci}$; and this output is applied to the potentiometer 144 whose tap 145 is at an intermediate $V_w$ position to obtain the output ($V_w$) $t_{ci}/R_{ci}$ on lead 144E which is applied as an input to each of the Sin-Cos potentiometers 123, 123A.

Height Finder Antenna Elevation System (FIG. 5)

The simulation of the elevation motion and position of the Height Finder radar antenna is accomplished as illustrated in FIG. 5 wherein a manual control knob 150 is connected to adjust the tap of five ganged potentiometers 151, 152, 153, 154 and 155 as indicated by the dotted lines. Two of the potentiometers 151, 152 are capable of generating sine functions and their resistnace strips are staggered eleven degrees so that the output of one represents Sin $\gamma$ and the other sin ($\gamma$ + 11°). Two of the potentiometers 153, 154 are capable of generating cosine functions and are staggered so that the output represent cos $\gamma$ and cos ($\gamma$ + 11°) respectively. The fifth potentiometer 155 is linear and its output represents the angle $\gamma$ over the range of 0° to 79°.

Another front panel control 157 controls the speed of a variable speed drive motor 158 which is geared to the movable tap of each of three ganged linear potentiometers 160, 161 and 162. Two of these potentiometers 160, 161 function as linear inerpolaters over the particular eleven degree range of sin ($\gamma$ + $\Delta\gamma$) and cos ($\gamma$ + $\Delta\gamma$) functions established by elevation sector control 150. The output of the third potentiometer 162 is summed with the output of the linear potentiometer 155.

The three functions developed are applied to chopper-stabilized DC amplifiers 165, 166 and 167 respectively where they are amplified and inverted to appear respectively as 115 sin ($\gamma$ + $\Delta$ $\gamma$), 115 cos ($\gamma$ + $\Delta$ $\gamma$)

and $$\frac{10}{\pi}(\gamma + \Delta\gamma).$$

For these purposes, as illustrated, one terminal of each of the potentiometers 151, 152, 153, 154, 155 and 162 is grounded, a minus 20 volt source is connected to the other terminal of potentiometers 151, 152, 153, 154 and 155 and a minus 50 volt source is connected to the other terminal of potentiometer 162.

The outside terminals of potentiometer 160 are connected respectively to the taps on potentiometers 151, 152 each having its lower angular reading closer to ground potential. The outside terminals of potentiometer 161 are connected respectively to the taps on the potentiometers 153, 154 each having its higher angular reading closer to ground potential.

The tap on potentiometers 160, 161 are each connected individually through a corresponding resistor 170, 171 to the input circuit of amplifiers 165, 166 respectively.

The taps on potentiometers 155 and 162 are coupled to the input of the same amplifier 167 through a corresponding resistor 173, 174.

The two outputs 115 sin ($\gamma$ + $\Delta$ ($\gamma$and 115 cos ($\gamma$ + $\Delta$ $\gamma$) are applied over leads 165 E and 166 E (FIGS. 5 and 6) and are used in conventional manner in standard Range-Height Indicator to generate the range height sweeps. The other output 10/$\pi$ ($\gamma$ + $\Delta$ $\gamma$) appearing on output lead 167 E (FIG. 5) is used as the instantaneous value of the elevation angle of the height finder antenna in various places in the chaff simulator. The quantity $\Delta$ $\gamma$ which is illustrated in FIG. 2 is the difference between $\gamma_{ci}$ and $\gamma_t$ may be derived by subtracting these two quantities and applying the same to terminal 260A in FIG. 10. For example, the target elevation angle is compared with the height finder antenna elevation angle to form a gating signal which allows the display of the synthetic target pulse when the antenna elevation and target elevations are equal or within about ½° of each other.

Chaff Computation (FIG. 9)

The implementation of the chaff computation is such that the chaff bundle data words are examined one at time as they appear at the output of the memory system. As each data word appears, its range, bearing, elevation and age are used to swiftly calculate the wind drift and gravity drop terms. These drift terms are added to the original range, bearing and elevation. The drifted bearing and elevation angles are then compared with the bearing and elevations angles of the simulated Search and Height Finder radar antennae as illustrated in FIG. 9.

In FIG. 9 the bearing of the antenna, $\Psi$ a, appearing on lead 99 in FIGS. 4 and 9 is subtracted from the sum of the initial chaff bundle bearing, $\Psi_{ci}$, appearing on lead 27 E in FIGS. 6 and 9 and the computed wind drift term $\Delta$ $\Psi$ appearing on lead 123 E in FIGS. 4 and 9 by applying the same to the input of operational amplifier 200 with the negative value of $\Psi_a$ being applied as an input. The amplifier 200 is thus an adder which adds a negative quantity in obtaining the quantity $\Psi_{ci}$ + $\Delta$ $\Psi$ $-\Psi_a$ at the output terminal 201 which however appears in inverted form. The inverted difference term is applied through resistor 204 to the input of a second inverter involving a second operational amplifier 203. A matched pair of diodes 206, 207 interconnected between the output terminals 201, 208 and having their junction point 209 connected to a plus fifteen volt source through resistance 210 selects the most positive output of the two amplifiers 200, 203 to form the absolute value of the difference, namely $/\Psi_{ci} + \Delta \Psi - \Psi_a/$ at terminal 209.

Because of the manner in which both variables $\Psi_{ci}$ and $\Psi_a$ are represented, that is with 0° equal to 0 volts and 359.6° equal to 10 volts, a large voltage difference exists when the antenna bearing and chaff bundle bearing are only a few tenths of a degree apart. In order to cause these large voltage differences to correctly appear as small bearing difference a third operational amplifier 211 is used to subtract 10 volts from the absolute value term, to form the term $10 - /\Psi_{ci} + \Delta \Psi - \Psi_a/$. For this purpose the terminal 209 is coupled through diode 212 and resistor 214 to the input terminal 215 of amplifier 211 to which is also applied a minus 10 volts through resistor 216. Another pair of matched diodes 218, 219 having their junction point 220 connected through resistor 222 to a minus 15 volt source selects the most positive of the two terms, $/\Psi_{ci} + \Delta \Psi - \Psi_a/$ and 10 minus $/\Psi_{ci} + \Delta \Psi - \Psi_a/$ and couples the same through resistor 223 to the input of a unity gain operational amplifier 224 which developes a bearing error voltage at its output.

To improve operating conditions at the input terminal 220 it is in a series circuit which extends from the negative 15 volt terminal 226 and through resistor 222, junction point 220 and diode 219, resistor 227 and to the plus 15 volt terminal 228, the junction point 229 of diode 219 and resistor 227 being coupled to the amplifier output terminal 230 through diode 231. Also a regulating transistor 235 of the 2N1711 type is used with its emitter being connected to terminal 226 and its base being connected at the junction point 236 of a resistor 237 and diode 238, the latter two elements being connected in a series circuit which extends from terminal 226, resistor 239, diode 238, junction point 236, resistor 237 to ground. The collector of transistor 235 is connected through resistor 240 to the junction point 241 between diode 212 and resistor 214.

The output of amplifier 224 is applied to the input of a push pull deflection amplifier 249 having its output connected to the horizontal deflection plates of a cathode ray rube (CRT) 250 of the 3KP16 type whereby horizontal cathode beam deflections are obtained in accordance with the bearing error, i.e., difference betweeen the antenna angle and the initial chaff bearing and chaff drift.

A constant two megacycle signal from source 251 is applied to the input of the related vertical deflection amplifier 252 to reduce the tendency of the phosphor on the CRT screen from burning due to a stationary bright spot.

A masking element 253 having a vertical slit 253A is placed over the face of the cathode ray tube 250 so that the cathode ray beam spot must fall directly behind the slit 253A in order for the light therefrom to impinge on the light sensitive cathode of the photomultiplier tube 255. The output of tube 255 is amplified in amplifier 256 to develope an azimuth gate voltage on lead 257 in FIGS. 9 and 7.

The width of slit 253A is about the same as the diameter of a sharply focused cathode ray beam spot. A control voltage, proportional to the age and inversely proportional to the range of the chaff bundle ($t_{ci}/R_{ci}$) is applied via lead 31AE in FIG. 6 to the focus electrode 260 of tube 250. As the electron beam is defocused by the voltage, the spot size becomes larger and a greater bearing error voltage can exist and still allow part of the beam light to pass through the slit.

The control grid 262 is driven by a voltage that corresponds to the density of the chaff bundle, modified by the age of the bundle, $D_{ci}(T_m - Kt_{ci})$. This equation is equation (18) above and it will be appreciated that the electrical quantity represented thereby involves a multiplication of the quantity $D_{ci}$ on lead 35E in FIG. 6 with the quantity $t_{ci}$ on lead 31E in FIG. 6 using constant values for the quantities $T_m$ and $k$ as previously explained. This term modulates the brightness of the spot and thus varies the output of the phototube 255.

Thus the output of the phototube after amplification in amplifier 256 forms a gating signal on lead 257 which is also connected to lead 257 in FIG. 7 whose amplitude is proportional to the "brightness" of the chaff bundle and is an inverse non-linear function of the bearing difference between the drifted chaff bundle and the antenna. This signal is analogous to the pattern of the main lobe of a radar antenna as it "sees" chaff bundles. The "beam width" is appropriately widened to simulate dispersal of chaff with the amount of widening depending on the ratio $t_{ci}/R_{ci}$.

The bearing comparison process described above is identical for both the Search and Height Finder systems, using duplicate circuits. Elevation angle comparison for the Height Finder is also very similar, with the output of the elevation difference amplifier $\gamma_{ci} + \Delta \gamma - \Delta$ a being applied to the vertical deflection amplifier of the cathode ray tube.

Antenna Pattern (FIGS. 10 and 11)

The cosecant squared vertical pattern of the search radar antenna is simulated by generating an attenuation function that decreases the strength of simulated chaff returns as a function of the elevation angle of each chaff bundle. The circuit of the function generator and a graph of its output are shown in FIGS. 10 and 11 respectively.

In FIG. 10 the inputs $\gamma_{ci}$ and $-\Delta \gamma$ on leads 29E and 260A respectively are applied to the input of an operational amplifier 260 through resistors 261 and 262 respectively together with a $-10$ volts applied from terminal 263 through resistor 264 to the input terminal 265. The quantity $\gamma_{ci}$ is derived from lead 29e in FIG. 29E The quantity $\Delta \gamma$ as seen in FIG. 2 involves a subtraction of the quantities representing the angles $\gamma_{ci}$ and $\gamma_t$ which are quantities appearing on leads 29E and 31CE respectively in FIG. 6. Connected between the input and output terminals 265 and 266 is a series circuit which includes the diode 268 and resistor 269, the junction point of which is connected to the $-10$ volt terminal 270 through resistor 271. The search elevation gate voltage appearing at output terminal 266 which is applied to lead 266 in FIG. 8 thus diminishes gradually in the range of chaff elevation angle between zero and 60°, and, at angles greater than 60°, the search elevation gate output voltage decreases at a higher rate as represented in FIG. 11.

The function generator of FIG. 10 is used instead of a cathode ray tube function generator to form the elevation gate signal for the simulated chaff bundles "seen" by the search radar. Thus, the search radar antenna beam simulation system uses one CRT and associated circuits (FIG. 9) for azimuth pattern simulation and a function generator (FIG. 10) for vertical pattern simulation. The Height Finder antenna beam simulation system uses one CRT and associated circuits (FIG. 9) for azimuth pattern simulation and another CRT with circuits very similar to that shown in FIG. 9, (one operational amplifier only performing elevation angle subtraction) to perform elevation beam simulation. The gains of the deflection amplifiers are adjusted to simulate the appropriate azimuth and elevation beam widths.

Memory System and Control Logic (FIGS. 6 and 8)

A high speed coincident current magnetic core memory capable of storing 320 words of 40 bits each is used. A memory address counter is provided to control access to the memory locations in the proper sequence. The memory system is capable 6f storing in sequential memory locations data presented via an input buffer, and of reading uata from sequential memory locations and presenting the data of one memory location at a time on ] separate set of output lines. Data read from a given memory location are restored in that same location so that the data, once stored in a given memory location, may be read and examined as many times as desired until it is intentionally erased.

Thirty two data input lines are provided, thirty-one of which are used, and one of which is spare. On each line, a logical "zero" is represented by 0 volts dc level and a logical "one" is represented by +6.5 volts dc.

Upon receipt of a WRITE command the memory completes the READ cycle it may be performing and then interprets the next READ command as a write command. The data presented at the input lines are stored into the first 31 bits (10 plus 10 plus 7 plus 4) of the location specified by a Memory Address Register 15A. The spare bit is set to "zero" and the last eight bits of the memory location, which define the age $t_{ci}$ of the chaff bundle, are also set to "zero."

When a READ command is received, (if a write command is not simultaneously present) the contents of the memory location specified by the Memory Address Register are read out and held in a Memory Information Register 15B. The contents of the Memory Information Register are then restored in that same memory location.

The address of the memory location into which data are to be stored or from which data are to be read is always specified by the Memory Address Register (MAR). The MAR is a 9-bit counting register and is permuted to count through the range of 0 to 319. As each READ or WRITE operation is completed, the MAR is caused to add one count. When the count reaches 319, the next count starts over again at 0. Thus at any time, the MAR contents determine the address of the memory location upon which a READ or WRITE operation is being performed, and at the conclusion of each operation the contents of the MAR determine the location of the next memory address in sequence.

In order that the data are store compactly in the core memory, data words are also stored by successive WRITE operations in sequential memory locations, 0, 1, 2, 3, ..., 319. In general, the current WRITE address will be different from the current READ address. Another register, called the Memory Transpose Register (MTR) is provided to keep track of the address of the next memory location upon which the next operation would be performed, if it were to be a different operation than the one currently being performed. That is, if a WRITE operation is in process, the WRITE address is in the MAR and the next READ address is in the MTR; if a READ operation is being performed, the READ address is in the MAR and the next WRITE address is in the MTR.

The MAR and the MTR are interconnected in such a way that the two registers can be caused to interchange their contents. This action takes place when the operating mode of the memory changes from WRITE to READ or from READ to WRITE, and occurs immediately at the start of a memory operation sequence (cycle). In this manner, only one counting register, the MAR, is used to control the selection of memory locations for both READ and WRITE.

Another register, called the Memory Information Register (MIR) is provided. This register is a 40-bit flipflop register and is the path through which data words are transferred into and out of the core locations. A data word that is to be transferred to or from a given memory location always appears in the MIR.

During a WRITE operation initiated manually by applying a signal to write lead 15W in FIG. 6 at that time when an operator desires to drop a chaff bundle, the data bits appearing on the 31 input lines i.e., ten lines from range converter 28 in FIG. 6, 10 lines from bearing converter 44, seven lines from elevation converter 66 and four lines from density converter 23, are gated into the first 31 bit positions of the MIR. The last 9 bit positions including the eight bit positions corresponding to $t_{ci}$ information are all set to zero. The contents of the MIR are then stored in the memory location whose address is specified by the Memory Address Register.

During a READ operation, the data word stored in the memory location whose address is specified by the Memory Address Register is gated into the MIR. This word is immediately replaced back into the same memory location. The data word is retained in the MIR and appears on the output lines extending to the digital to analog converters 25, 27, 29, 35, 31, 31A (FIG. 6) until the beginning of the next READ or WRITE operation.

The last 8 bit positions of the MIR corresponding to $t_{ci}$ information are connected as a binary counter. This 8-bit portion of the MIR is called the Update Register 15C. The Update Register receives the age term of each word read from memory. At intervals of 7½ seconds, a signal is sent to the core memory which causes the Update Register to add one count to the age term of each of the 320 data words after it is read from its core location and before it is replaced.

The age term is set to zero when a new chaff bundle is dropped. i.e., at the time of application of a write signal to write lead 15W, such signal may be applied, as for example, by manually closing a switch signifying the dropping of a chaff bundle whose characteristics are established by prior adjustment of the various control knobs associated with unit 9 in FIG. 6. Since the bundles are dropped at various times, the age terms reach full scale (30 minutes) at various times. A detector is built in to inhibit counting of the Update Register when full scale count is detected for the age term of the data word then present in MIR. This causes the age term $t_{ci}$ to remain at full scale after 30 minutes.

Memory Control Logic (FIG. 8)

As a part of each read operation initiated by a clock signal applied to read lead 15R in FIG. 6 the magnetic core memory restores each data word into its original location prior to beginning the next operation. The complete read/restore process requires somewhat less than 5 microseconds. Therefore, the minimum time between successive clock pulses is at least 5 microseconds. When read and write operations are being intermixed, the time required to complete a write and transfer back to read requires nearly 6 microseconds for proper memory operation. Since read and write operations are randomly intermixed the clock period is set to slightly more than 6 microseconds.

FIG. 8 illustrates a block diagram of circuitry common to both simulated radars and also the circuitry associated with one of the two simulated radars used to control the generation of clock pulses.

A free running asymmetrical multivibrator 300 operating at 162 kilocycles per sec. (6.2 microseconds) establishes the interval for clock pulses, and the output of each side of the same is connected correspondingly via a pulse "and" gate 301, 302 to a one shot multivibrator 303, 304, respectively. The timing is such that four microseconds after the leading edge of the clock pulse developed on output lead 15R of multivibrator 304, the other one shot multivibrator 303 generates a strobe pulse on lead 305. This lead 15R in FIG. 8 is connected to the read lead 15R in FIG. 6.

However, in order that the clock and strobe pulses may be generated, the A and B flip-flops 309, 310 associated with both simulated radars must be in the reset state whereby the control output 311 of the four legged "and" gate 312 is effective to remove an inhibiting signal from the two pulse "and" gate 301, 302 of the two one shot multivibrators.

The azimuth gate and elevation gates present on corresponding leads 257, 266 and derived as described in connection with FIGS. 9 and 10 are amplified respectively in amplifiers 316, 317 and applied to the input of an "and" gate 319 to which is also applied the strobe on lead 305 and also the output of an "or" gate 320, the input to this gate 320 being the four density bits indicated as $\overline{D}$ ½, $\overline{D}1$, $\overline{D}2$, and $\overline{D}4$. These density bits are established in accordance with the setting of density knob 23A in FIG. 6 with the analog value being transformed by analog to digital converter 23 in FIG. 6 to four bit information which is stored in memory and later applied to the OR gate 320 in FIG. 8.

These four density bits are combined in the "or" gate 320 to ensure that a spurious output of the azimuth and elevation gate circuits will be ignored. This is so since data words that describe genuine chaff bundles have at least one "one" in the digital representation of density and are applied along with the strobe pulse, to inputs of the same "and" gate 319.

When all four inputs are simultaneously present at the "and" gate 319, a condition exists which is used to indicate that the data word presently in the Memory Information Register 15B describes a chaff bundle that is in the antenna beam of one of the simulated radars. When this condition exists, the output of the "and" gate 319 is passed through the pulse "and" gate 321 to the set input of the A flip-flop 309, causing it to change from the reset to the set state.

When the A flip-flop 309 is thus set, an enabling input is applied over lead 322 to the pulse "and" gate 323 of the range multivibrator 324; and also one of the enabling inputs on lead 325 is removed from the four legged "and" gate 312 so that the generation of clock and strobe pulses is then inhibited.

In the absence of clock pulses, the core memory holds the last read data word at its output. At some short time later, the "drifted" range of the chaff bundle is equated by the internal range sweep, this range and range sweep being compared in amplifier 330 whose output is amplified in amplifier 332 and applied to the input of "and" gate 323 to cause the generation of an output range pulse on lead 334. This range pulse is processed and displayed on the indicators as one "hit" on a bundle of chaff, as described in connection with FIG. 9. This range pulse is also inverted in inverter 335 whose output is used to set the masking gate flip-flop 336 having an output on lead 336E in FIG. 8 applied via lead 336E in FIG. 7 to an And gage 415 for gating target video. The leading edge of this inverted range pulse is applied through a pulse "and" gate 337 to set the B flip-flop 310. After the B flip-flop 310 is thus set, it applies an enabling pulse via lead 340 to an "and" gate 341 so that the trailing edge of the range pulse on lead 334 can then reset the A flip-flop 309.

When the A flip-flop 309 is reset, the next pulse from the free running multivibrator 300 applied over lead 343 to the "and" gate 345 resets the B flip-flop 310, restoring the last enabling signal to the clock controlling four legged "and" gate 312. Two microseconds later the negative going edge of the multi-vibrator output is passed through the pulse "and" gate 302, thereby causing a clock pulse to be generated and causing the core memory to read data from the next sequential storage location.

In the event the "drifted" range of the chaff bundle should be negative or greater than 250 miles, a range pulse is not developed on lead 334 and for that reason provision is made so that the radar synch pulses RT appearing on leads 80E in FIGS. 3 and 8 are used in setting the B flip-flop 310 and resetting the A flip-flop 309. For these purposes, the radar synch pulses appearing at lead 80E are inverted in inverter 344A and applied, in inverted form, to "and" gates 346 and 348 whose outputs are applied to the reset circuit of flip-flop 309 and the set circuit of flip-flop 310

In either sequence of operations, clock pulses are generated only when both the A and B flip-flops 309, 310 are reset. Finding a chaff bundle in the beam of one of the radars always causes the A flip-flop 309 to be set, inhibiting the clock. The B flip-flop 310 will then be set by either the leading edge of the inverted range pulse, or, in its absence, by the leading edge of the inverted radar synch pulse. The A flip-flop 309 will then reset by the trailing edge of the range pulse or, in its absence, by the leading edge of the next inverted radar synch pulse. The B flip-flop 310 is always the last one to be reset and is always reset by the negative going edge of the multivibrator output of the freerunning multivibrator 300. This ensures that proper spacing will always be maintained between successive clock pulses so that either a read or a write operation may be performed at any time without malfunction and resultant obliteration or mutilation of stored data.

Thus an output signal above a minimum level from both the azimuth and elevation gates for one of the two simulated radars is necessary to indicate that the data word then present at the Memory Information Register of the core memory describes a chaff bundle that should be displayed on the appropriate radar indicator.

On each read cycle of the core memory, data appears on the output lines 2 microseconds after the start of the clock pulse. In order to allow time to perform the wind and gravity computations and to achieve a stable deflection position on the CRT's, an additional 2 microseconds is required.

The strobe pulse on lead 305 is generated 4 microseconds after the start of each clock pulse. This pulse determines the time at which the outputs of the azimuth and elevation gates for both simulated radars are sampled. If an output is present at both gates of either one of the simulated radars, a flip-flop is set, so that subsequent clock pulses will be inhibited. Inhibiting the clock causes the last-read data word to remain at the output of the core memory.

The system remains in this state until the voltage that represents the drifted range of the chaff bundle ($R_{ci}$ + $\Delta R$) is exactly equal to an internal range sweep. A block diagram of the circuits that perform the range comparison, display pulse generation and subsequent video processing is shown in FIG. 7. In FIG. 7, those elements illustrated as being on the Chaff Computer Chassis and Radar Simulator Chassis are also shown in FIG. 8, but FIG. 7 differs in showing the manner in which the chaff video and masking gate outputs are used. Corresponding elements in FIGS. 7 and 8 have identical reference numerals.

The negative going chaff range sweep developed by the sweep generator 82 in FIG. 3 is applied via lead 82E to one input of an operational amplifier 330. Other inputs are voltages representing initial chaff range, $R_{ci}$ (from the core memory output via a digital-to-analog converter 25 as shown in FIG. 6) and the computed range component $\Delta R$ of wind drift via lead 122E (FIG. 4). The input $R_{ci}$ is obtained from lead 25E in FIG. 6 and is initially derived from the shaft encoder 28 in FIGS. 6 and 3.

When the voltage of the range sweep exactly equals the voltage representing the range to the "drifted" chaff bundle, the operational amplifier output makes a negative to positive transition of about 1½ volts. This transition is amplified in amplifier 332 and applied to "and" gate 323 along with the signal on lead 322 (FIG. 8) that is present only if the clock is being inhibited. This is desirable because many transitions occur as the memory is scanned looking for chaff bundles that lie in the beam of the simulated radar antennae. The "and" gate 323 prevents unwanted transitions from generating spurious display pulses. If the "clock stopped" signal is present, the amplified transition will be passed to the Range Pulse Generator 324 causing a single pulse to be generated. A control input to the pulse generator is voltage $t_{ci}$ on lead 31E proportional to the age of the chaff bundle. This control signal causes the duration of the display pulse to increase as the age of the chaff bundle increases in order to simulate growth of the chaff bundle.

The azimuth and elevation gate signals as illustrated in FIGS. 7 and 8 are combined in a high speed multiplier 407 (a dual control vacuum tube) to provide a gating signal whose amplitude is proportional to the product of the amplitudes of the two gating signals. This composit gating signal after amplification in amplifier 408 is applied to an "and" gate 409 along with the display pulse. The pulse output of "and" gate 409 is limited at a value corresponding to the amplitude of the product of the gating signals applied to stage 407, and so is a direct function of bundle density, and inverse functions of age of the bundle and of the angular differences between the azimuth and elevation angles of the simulated antenna and those of the simulated chaff bundle.

A flip-flop 336 is used to provide a blanking signal to mask the target when it is on the same bearing and elevation as a chaff bundle and is also at a greater range. This flip-flop is reset at the beginning of each range sweep by the sync pulse developed on lead 80E in FIG. 3. The leading edge of each chaff display pulse trigers the flip-flop 336 to the set state. When the flip-flop 336 is set, it inhibits any target video pulse that occurs later during that range sweep, thus masking the synthetic target when it is behind a chaff bundle.

The gated target video which is gated in gate circuit 415 and the chaff video are combined in video mixer 416 and the composite signal is attenuated in attenuator 417 by a function of range, so that the strongest targets and chaff will just disappear at a range of 200 miles. The output of the range attenuation circuit is applied to the video input connector of the appropriate radar indicator. The circuitry described above and shown in FIG. 7 is duplicated and is identical in both the Search and Height-Finder simulation systems.

The generation of the chaff display pulse initiates the process of resetting the flip-flop that controls the clock generation circuits. When the next clock pulse is transmitted to the memory, a data word representing another chaff bundle will be presented to the chaff computation circuits, so that the entire process described above can begin again.

Figure 12:
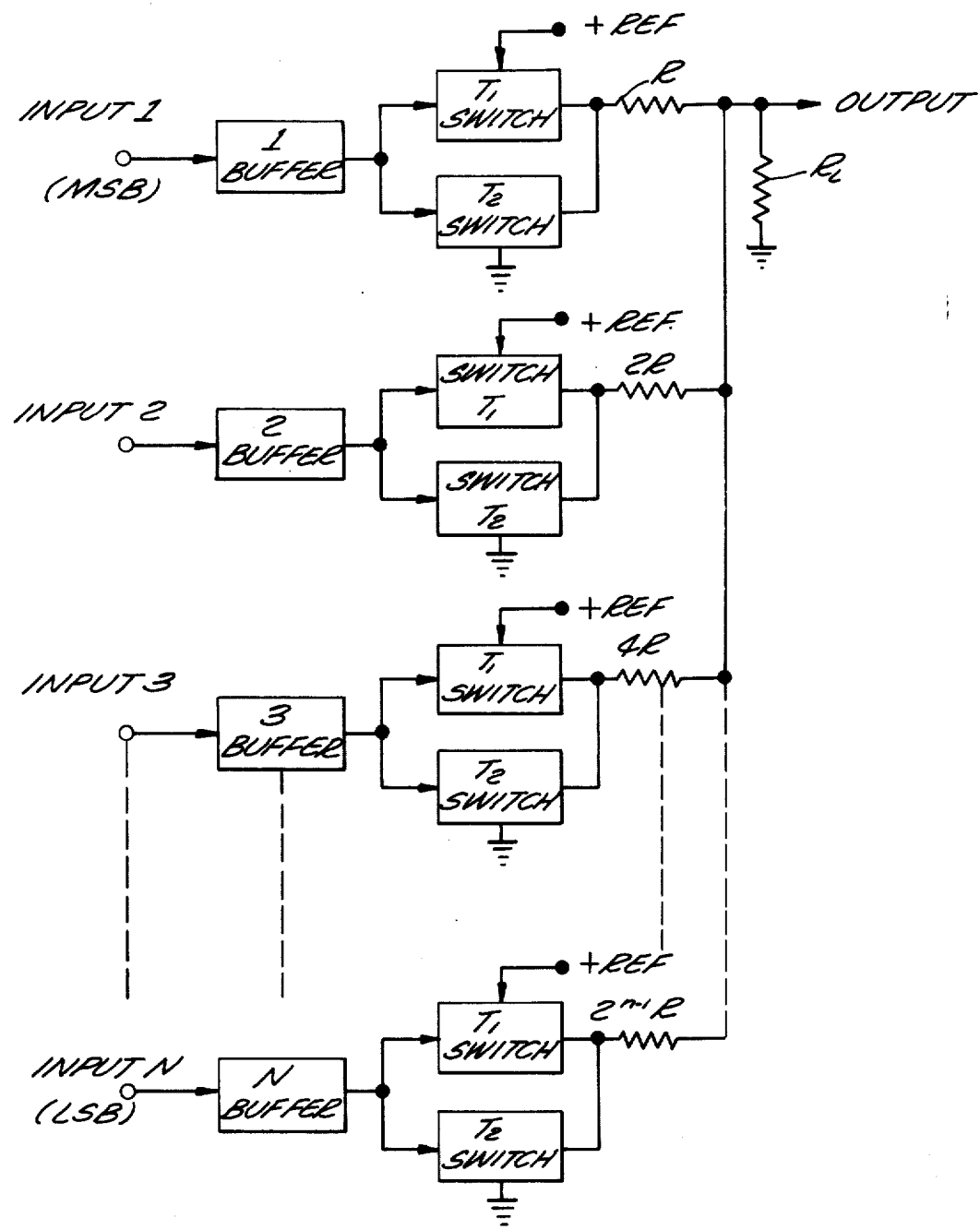
FIG. 12 illustrates one form of digital to analog converter which may be used.

Digital-to-Analog Conversion (FIG. 12)

The digital-to-analog converters used to convert the digital representation into an analog voltage are each typified in FIG. 12. The data input lines 1–N from the memory system are applied to the corresponding buffers 1–N. Each buffer drives a pair of switching transistors $T_1$, $T_2$ which connect their common corresponding weighting resistor $R \cdot 2^{n-1} R$ to either + REF or to ground, depending on the "one" or "zero" state of the input line. The currents from all weighting resistors are summed in a common load resistor $R_L$ to produce the analog voltage output. The analog output voltage bears the same fractional relationship to the + REF voltage as the digital input value has to digital full scale.

It is also possible to use a variable positive voltage in place of the fixed reference voltage so that the output of the digital-to-analog converter represents the product of the digital input value and the variable used instead of the reference. This technique provides a convenient and accurate means of high-speed multiplication, as well as digital-to-analog conversion of the digital variable.

In operation of the system, the path of a moving target is simulated and is characterized by three dimensions. namely, range, height and bearing and such simulated path is changeable by changing the positions of either one of the following in FIG. 3, namely, range control 10, elevation control 50 or bearing control 30. During the "flight" of such moving target chaff may be ejected therefrom at different spaced points along such path by applying a write signal to write lead 15W (FIG. 6) so that each coordinate of the particular point at which such chaff then appears is converted from analog-to-digital form and then stored in digital form in a memory system. Also stored at that time in digital form is an age quantity (a constant value which changes in time subsequently) and a density quantity indicative of the weight of the chaff, such age and density quantities being used during subsequent readout in making computations that determine the appearance of the chaff displayed on cathode ray tubes in the PPI range-height indicating systems. The age quantity is used also in computing a subsequent position of the chaff due to assumed wind and gravity effects. Thus it is contemplated that not only the location but also the appearance of the chaff be altered after it is ejected. Each of the two indicators (PPI and range-height) are operated with video being applied representative of the chaff in its changing location (due to wind and gravity) and also appearance due to (1) fading (using an attenuation factor that changes with time) and (2) dispersion (using an increased apparent azimuth and elevation beam width that is directly proportional to age of a dropped chaff bundle and inversely proportional to range of the bundle) with the third dimension being also widened by widening of the return video pulse in accordance with age and (3) attenuation (a factor which is generated in proportion to range). magnitudes These computations are made after the primary data is read out of storage. During such readout the cathode beam deflecting circuits of the indicating systems are operating and intensity control elements of the indicators are receptive to video which is gated and processed in accordance with these computations to obtain the desired appearance.

While the particular embodiments of the present invention have been shown and described, it will be obvious to those skilled in the art that changes and modifications may be made without departing from the invention in its broader aspects and, therefore, the aim in the appended claims is to cover all such changes and modifications as fall within the true spirit and scope of this invention.

We claim:

1. In a chaff simulating system, a position generator including means for developing electrical values representative respectively of chaff range, chaff bearing and chaff elevation; means for converting each of said values into a corresponding coded digital representation; a memory system in which a digital representation of each of said values is stored; a plan position indicating system; a range-height radar indicating system; means for producing electrical magnitudes representative of the instantaneous position of a radar beam in said plan position indicating system and the bearing and elevation movements of an antenna in said range-height radar indicating system; encoder means for converting said digital representations to electrical values; and means comparing the last-mentioned electrical values with said magnitudes to obtain a comparison of said values with said magnitudes for altering indications in said plan position indicating system and said range-height indicating system in accordance with said comparison.

2. A system as set forth in claim 1 including means for developing an age term and means for developing a density term each in a coded digital representation and storing the same in said memory system together with said corresponding digital representation of the same chaff bundle; encoder means for converting said digital representations of density and age to electrical values which cause said indications to change in accordance with said densities and age values.

3. The method of simulating chaff in a radar system including the steps of developing digital information as to the range, height and bearing of simulated chaff; storing said information in a memory system; developing electrical values representative of radar antenna movements, encoding said digital information and making a comparison of the encoded information with said values, and producing visual indications in accordance with said comparisons.

* * * * *